United States Patent
Herko et al.

(10) Patent No.: US 11,648,703 B2
(45) Date of Patent: May 16, 2023

(54) VACUUM BELT DEBURRING ASSEMBLY

(71) Applicant: Xerox Corporation, Norwalk, CT (US)

(72) Inventors: Jonathan Herko, Walworth, NY (US); George L. Vassilaros, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 44 days.

(21) Appl. No.: 16/917,960

(22) Filed: Jul. 1, 2020

(65) Prior Publication Data
US 2022/0001566 A1 Jan. 6, 2022

(51) Int. Cl.
*B26F 1/02* (2006.01)
*B65G 15/32* (2006.01)
*B26D 7/18* (2006.01)

(52) U.S. Cl.
CPC .............. *B26F 1/02* (2013.01); *B26D 7/1863* (2013.01); *B65G 15/32* (2013.01)

(58) Field of Classification Search
CPC ...... B26D 2007/1809; B26F 1/08; B26F 1/31; B65G 15/32; B65G 45/14; B65G 45/24; B21D 28/02; B21D 28/30; B21D 43/027
USPC .................. 83/25, 108, 119, 155.1, 660, 935
See application file for complete search history.

(56) References Cited

U.S. PATENT DOCUMENTS

| | | | | |
|---|---|---|---|---|
| 1,239,066 A * | 9/1917 | Winters | ............... | B65G 45/14 198/849 |
| 2,122,368 A * | 6/1938 | Engler | ............... | B26F 1/44 83/862 |
| 2,881,836 A * | 4/1959 | Thiem | ............... | B26D 7/1818 83/25 |
| 3,088,353 A * | 5/1963 | Hanington | ........ | A61F 13/00987 83/24 |
| 3,444,028 A * | 5/1969 | Belfield | ............... | B27N 3/16 425/115 |
| 3,610,082 A * | 10/1971 | Riggi et al. | ........... | B21D 28/02 83/108 |
| 4,305,716 A * | 12/1981 | Nickum | ............... | B23P 15/406 493/373 |
| 4,349,098 A * | 9/1982 | Veenhof | ............... | B65G 45/14 198/497 |
| 4,552,709 A | 11/1985 | Kroger, II et al. | | |
| 4,854,203 A * | 8/1989 | Wever | ............... | B26F 1/0007 83/321 |
| 4,878,825 A * | 11/1989 | Mullane, Jr. | ........... | B29C 59/06 425/290 |
| 5,762,253 A | 6/1998 | Åberg et al. | | |
| 6,446,789 B1 | 9/2002 | Goodman | | |
| 9,718,102 B2 | 8/2017 | Duan | | |

(Continued)

FOREIGN PATENT DOCUMENTS

GB 2241915 A * 9/1991 ............. B29C 35/10

*Primary Examiner* — Ghassem Alie
*Assistant Examiner* — Samuel A Davies
(74) *Attorney, Agent, or Firm* — Gibb IP Law Firm, LLC

(57) ABSTRACT

A deburring apparatus includes (among other components) a frame and an elongated flat element connected to the frame. Rollers are adapted to support and rotate a vacuum belt around the apparatus. A perforation device is positioned and adapted to make perforations in the vacuum belt as the vacuum belt is rotated by the rollers. Making the perforations in the vacuum belt causes debris to remain in at least one of the perforations. The elongated flat element is positioned to contact the debris in the perforations.

17 Claims, 4 Drawing Sheets

(56) References Cited

U.S. PATENT DOCUMENTS

| | | | | |
|---|---|---|---|---|
| 11,242,210 B1* | 2/2022 | Bitondo | ............... | B65G 45/26 |
| 2002/0189978 A1* | 12/2002 | Freeman | ............... | B26D 7/18 |
| | | | | 209/307 |
| 2005/0160888 A1* | 7/2005 | Hoogland | ............... | B26F 1/40 |
| | | | | 83/13 |
| 2006/0243306 A1* | 11/2006 | Wimsatt | ............... | B08B 1/02 |
| | | | | 134/9 |
| 2007/0125756 A1 | 6/2007 | Kelly et al. | | |
| 2008/0026090 A1* | 1/2008 | Ehrbar | ............... | B26F 1/40 |
| | | | | 425/302.1 |
| 2009/0173599 A1* | 7/2009 | Khanania | ............... | B65G 45/16 |
| | | | | 198/497 |
| 2010/0011924 A1* | 1/2010 | Bernreuter | ............... | B26D 5/02 |
| | | | | 83/39 |
| 2012/0085621 A1* | 4/2012 | Bryl | ............... | B65G 45/14 |
| | | | | 198/494 |
| 2013/0247732 A1* | 9/2013 | Imamaki | ............... | B26D 7/088 |
| | | | | 83/168 |
| 2014/0318338 A1* | 10/2014 | Horii | ............... | B26D 7/1818 |
| | | | | 83/102 |
| 2016/0152417 A1* | 6/2016 | Rolfsson | ............... | B65G 45/12 |
| | | | | 15/256.5 |
| 2017/0174441 A1* | 6/2017 | Strathaus | ............... | B65G 45/12 |
| 2018/0339418 A1* | 11/2018 | Bormann | ............... | B26F 1/384 |
| 2019/0022888 A1* | 1/2019 | Villois | ............... | B26F 1/14 |

* cited by examiner

VACUUM BELT DEBURRING ASSEMBLY

BACKGROUND

Systems and methods herein generally relate to devices that manufacture vacuum belts and more particularly to devices involved with the formation of perforations within vacuum belts.

Manufacturing methods for vacuum transport belts (e.g., such as those used in printing devices) perforate thin film plastic substrates by either laser or mechanical means. Both process can leave less than a desirable surface finish on the belt. Surface defects induced by the perforation process include annular protrusions around the perimeter of the hole and hole centers which can remain partially attached. These defects can disrupt the vacuum transport function in the machine and lead to print head strikes and motion quality issues.

SUMMARY

Apparatuses herein include, among other components, a frame and an elongated flat element connected to the frame. Rollers are adapted to support and rotate a vacuum belt (e.g., made of a plastic material, fibrous material, composite material, etc.) around the apparatus. A perforation device is positioned and adapted to make perforations in the vacuum belt as the vacuum belt is rotated by the rollers; however, making the perforations in the vacuum belt causes debris to remain in at least one of the perforations. The perforation device can be, for example, a punch device or a laser cutting device.

In view of this, the elongated flat element is positioned to contact the debris in the perforations and a vacuum device is also connected to the frame. The vacuum device is positioned and adapted to draw the debris from the perforations into the vacuum device by applying negative pressure from the vacuum device to the perforations.

The elongated flat element is positioned to contact the debris in the perforations. More specifically, the elongated flat element is rotatably connected to the frame. Further, the elongated flat element is rotatable between a first position and a second position. The elongated flat element does not contact the debris in the perforations in the first position, but the elongated flat element does contact the debris in the perforations in the second position. The elongated flat element has a knife edge, and the knife edge contacts the debris in the perforations. Also, the elongated flat element can be, for example, metal, plastic, or ceramic.

Various methods herein include processing that rotates a vacuum belt on rollers that are connected to a frame. These methods make perforations in the vacuum belt as the vacuum belt is rotated by the rollers using a perforation device connected to the frame. The process of making the perforations can be performed using a punch device or a laser cutting device. Sometimes the process of making of the perforations in the vacuum belt causes debris to remain in at least one of the perforations.

In view of this, these methods draw the debris from the perforations into a vacuum device connected to the frame by applying negative pressure from the vacuum device to the perforations. Additionally, these methods contact the debris in the perforations using an elongated flat element connected to the frame. More specifically, this process rotates the elongated flat element until it contacts the debris in the perforations. Thus, the process of rotating the elongated flat element rotates the elongated flat element between a first position and a second position. The elongated flat element does not contact the debris in the perforations in the first position, but the elongated flat element does contact the debris in the perforations in the second position. The elongated flat element has a knife edge, and the process of contacting the debris is performed using the knife edge. Also, the elongated flat element can be metal, plastic, or ceramic.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As noted above, when perforations are formed in vacuum belts during manufacturing, debris (e.g., burrs, chads, disks, plugs, etc.) can remain attached to the vacuum belt and this debris can detrimentally affect vacuum belt function by preventing or reducing vacuum flow through the perforations. While vacuum belts can be manually deburred during inspection, such manual processes are both tedious and labor intensive. In view of this, embodiments herein provide a stand-alone deburring assembly that includes a vacuum device (e.g., intake of an air knife) and a rotating knife assembly that remove any protrusions or remaining plugs from the vacuum belt.

Specifically, the air knife clears debris from the knife edge and vacuum holes to keep the debris from accumulating at the knife-belt interface, and also generates a pressure differential to improve contact between the belt and the knife. The entire knife assembly is a stand-alone unit and can be easily installed or removed as a unit to or from an existing vacuum belt perforation assembly.

In greater detail, the pressure differential created by the air knife pulls the entire width of the belt material against the knife edge, mitigating issues with edge curl. The knife assembly can include, for example, a chisel style knife and the approach angle of the knife is maintained to be shallow enough to prevent damage or tear propagation in the vacuum belt.

With embodiments herein, the knife assembly is biased (e.g., spring loaded) to allow the knife to rotate (and therefore be retractable) to control the pressure the knife applies to the vacuum belt and to control the timing of when the knife comes into contact with the vacuum belt (e.g., for safety purposes). In some examples, the knife can engage automatically after the perforation process is complete. Further, the bias applied to the knife is controlled to reduce torque loading of the knife on the vacuum belt and to improve vacuum belt motion quality.

The deburring assembly herein automates the deburring process with minimal impact on the overall process cycle time or throughput and thereby improves the quality of vacuum transport belts as well as reduces manufacturing time and costs by eliminating manual de-burring, cleaning, and inspection of belts.

Figure 1A:
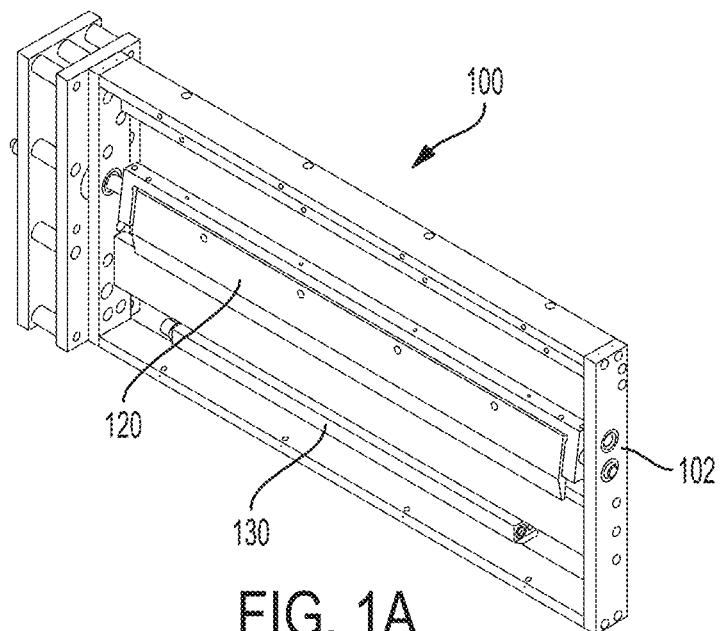
FIGS. 1A-1B are perspective views of debris removal devices herein.
Figure 1B:
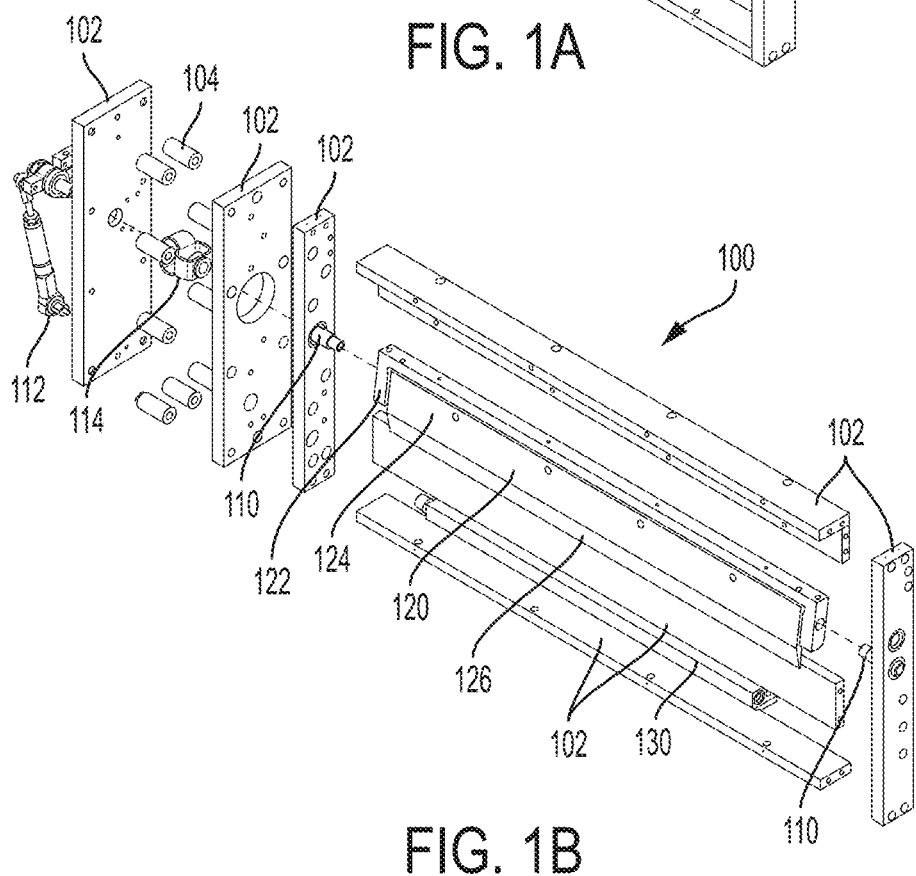

FIG. 1A is a perspective view of the stand-alone debris removal device 100 (deburring assembly) and FIG. 1B is the same view of the same device 100 in exploded view. As shown in FIGS. 1A and 1B, an elongated flat element 120 (knife) and vacuum device 130 are connected to a frame 102.

FIG. 1B shows that the elongated flat element 120 includes a rotatable mount element 122 and a knife 124 connected to the rotatable mount element 122. Different components of the elongated flat element 120 can be, for example, metal, plastic, ceramic, etc.

FIGS. 1A and 1B show that the knife 124 of the elongated flat element 120 has mounting holes permitting connection of the knife 124 to the rotatable mount element 122. Further, FIGS. 1A and 1B show that the knife 124 can include a narrowed portion that comes to a point or sharpened edge (e.g., knife edge 126).

Figure 2A:
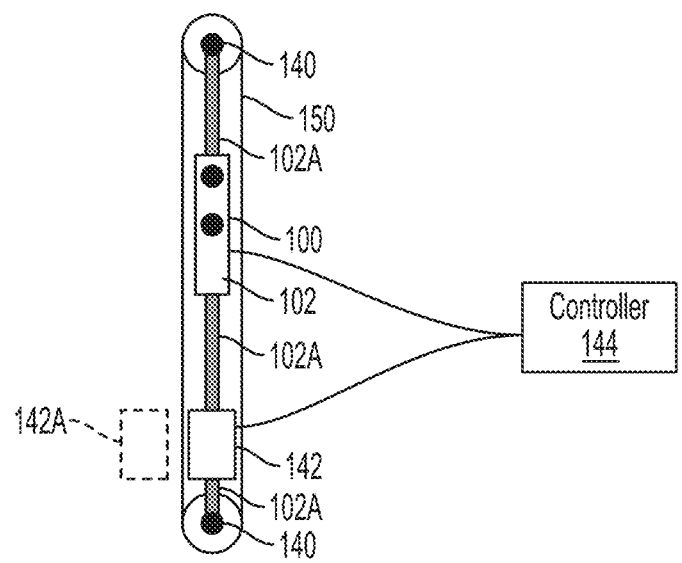
FIGS. 2A-2D are side views of debris removal devices herein.
Figure 2B:
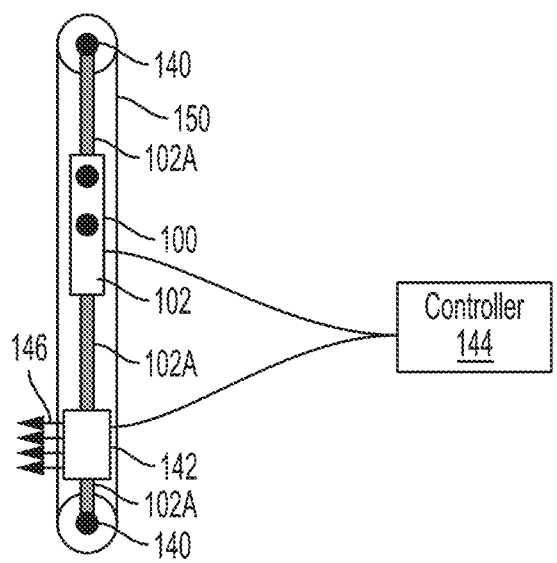
Figure 2C:
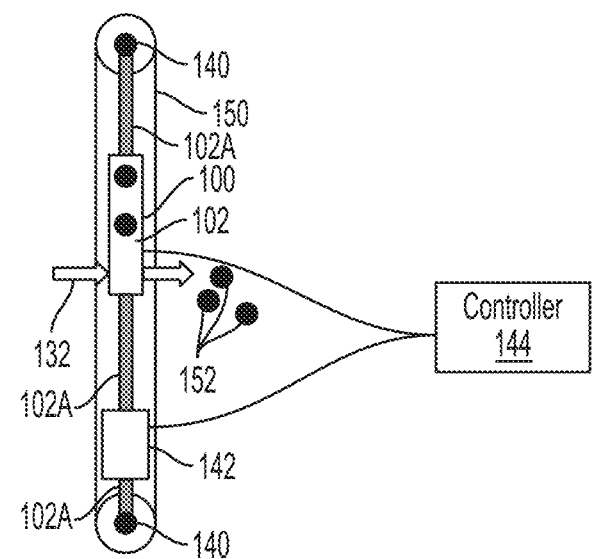
Figure 2D:
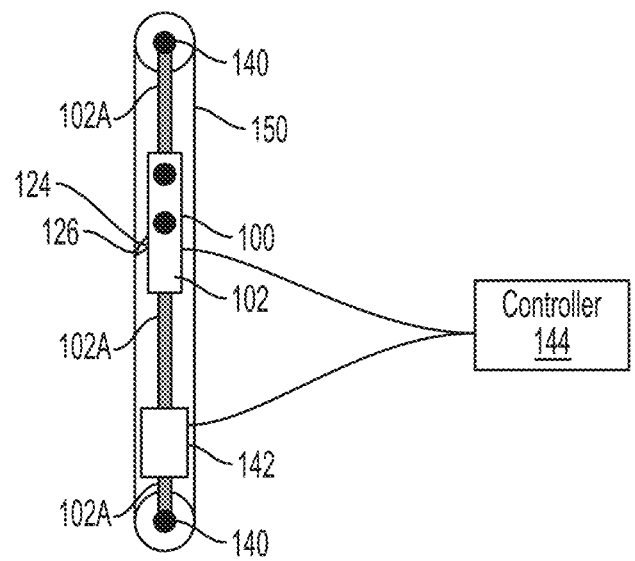

The elongated flat element 120 is rotated to bring the knife edge 126 into contact with a vacuum belt, as shown in FIG. 2D, discussed below. FIG. 1B illustrates a bias assembly that includes a bias member 112, a control device 114, and axles 110. FIG. 1B also illustrates spacers 104 of the frame 102 that support the bias member 112, control device 114, etc.

The bias member 112 is a mechanical bias device (e.g., spring, band, etc.) or electrical motor that outputs rotational movement that is controlled by the control device 114. The control device 114 is connected to a controller (e.g., item 144 shown in FIGS. 2A-2D, discussed below) of the perforation device, as explained below. The control device 114 allows the bias produced by the bias member 112 to be transmitted to the axle 110 to rotate the rotatable mount element 122, which rotates the elongated flat element 120 (and knife 124), when appropriate.

FIGS. 2A-2D are side views of the debris removal device 100 positioned within a perforation assembly. FIG. 2A shows that perforation assemblies commonly include, among other components, rollers 140 connected to a frame 102A (which can be considered to be an element of, or connected to, the frame 102 mentioned above). The rollers 140 are adapted to support and rotate a vacuum belt 150 (e.g., made of a plastic material, fibrous material, composite material, etc.) to position an endless loop of belt material.

A perforation device 142 is also connected to the frame 102A. The perforation device 142 can be, for example, a punch device or a laser cutting device. The perforation device 142 can be located within the loop of the vacuum belt 150, as shown by item 142, or outside the loop of the vacuum belt, as shown by the broken line item 142A (which is only shown in FIG. 2A to reduce clutter in the drawings).

As noted above, the stand-alone debris removal device 100 can be easily mounted within an existing perforation assembly (e.g., within the loop of the vacuum belt 150) such that the vacuum belt is around the debris removal device 100. Stated differently, the debris removal device 100 is positionable (mountable) within the loop of the vacuum belt 150 (e.g., positionable within the perforation assembly). A controller 144 can be connected to (in communication with) the stand-alone debris removal device 100 and the perforation device 142 to control both and coordinate operations between the two.

FIG. 2B shows that the perforation device 142 is positioned and adapted to make perforations in the vacuum belt 150 as the vacuum belt 150 is rotated by the rollers 140 and the act of making perforations is shown by laser light (arrows 146) passing through (exiting) the vacuum belt 150. Each portion of the vacuum belt 150 can pass by the perforation device 142 multiple times during the process of making perforations.

FIG. 2C shows that the vacuum device 130 (obscured by the frame 102 in the side view of FIG. 2C) can draw and push air (represented by arrows 132) to cause debris 152 to be sucked or blown from the vacuum belt 150.

The elongated flat element 120, and accompanying knife 124, are rotatable between a first position and a second position. FIGS. 2A-2C show the elongated flat element 120 in the first position (and the same is shown in FIGS. 1A-1B); however, the knife is obscured in the side view of FIGS. 2A-2C by the frame 102. However, FIG. 2D shows the elongated flat element 120, and accompanying knife 124, rotated to the second position, which allows a portion of the knife 124 to be seen extending from behind the frame 102 to contact the vacuum belt 150 in the side view in FIG. 2D. FIG. 2D shows that the knife edge 126 contacts the vacuum belt 150.

More specifically, because the debris removal device 100 is within the loop of the vacuum belt 150, the knife 124 contacts the backside (inside or bottom) of the vacuum belt 150, which is the side of the vacuum belt 150 opposite the side used to transport items (opposite the frontside, outside, or top) such as paper, etc. Therefore, any scraping or minor damage the knife 124 may make to the backside of the vacuum belt 150 will not affect the outside of the vacuum belt 150 and, therefore, will not affect the interface (the outside of the vacuum belt 150) between items being transported and the vacuum belt 150. Therefore, positioning the debris removal device 100 within the loop of the vacuum belt 150 (e.g., positionable within the perforation assembly) produces a substantial benefit of not altering the outside of the vacuum belt 150 during the debris removal (deburring) process.

While the perforation process (FIG. 2B), air knife operation (FIG. 2C), and knife 124 rotating to contact the vacuum belt (FIG. 2D) are shows as separate processes performed at different times, one or more of such processes could be performed at the same time (simultaneously), as shown for example in FIG. 3, discussed below.

Figure 3:
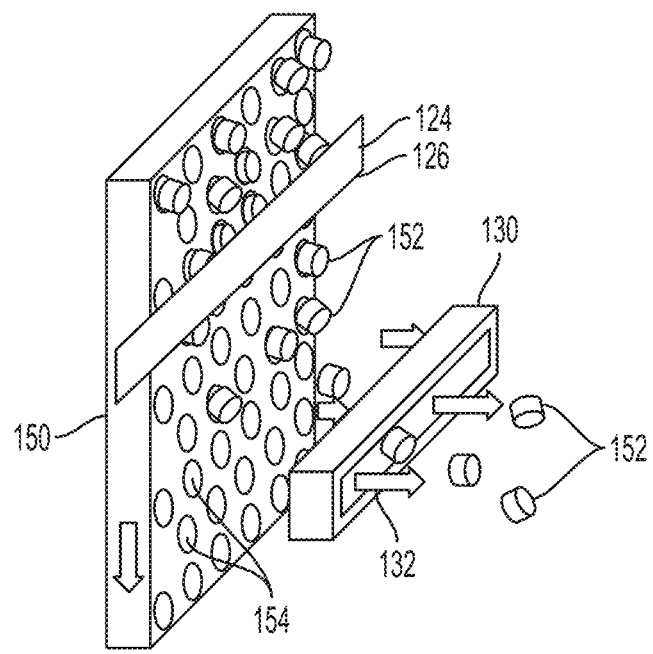
FIG. 3 is a perspective view of portions of a vacuum belt and portions of debris removal devices herein.

More specifically, FIG. 3 shows a closeup view of a portion of the vacuum belt 150 and the knife 124 and vacuum device 130 (without the other elements shown to reduce clutter). As can be seen in FIG. 3, making the perforations 154 in the vacuum belt 150 can cause debris 152 to remain in at least one of the perforations 154. FIG. 3 also shows that the vacuum device 130 is positioned and adapted to provide an air pressure differential to draw (or push) the debris 152 from the perforations 154. In one example, the debris is drawn into and through the vacuum device 130 by applying negative pressure from the vacuum device 130 to the perforations 154 in the vacuum belt 150. The knife 124 of the elongated flat element 120 is simultaneously positioned to contact the debris in the perforations (rotated into the second position) while the vacuum device 130 applies vacuum in FIG. 3.

Note that the vacuum belt 150 is shown to have a movement direction downward in FIG. 3 (see block arrow); however, the movement of the vacuum belt 150 could be in the opposite direction. Therefore, the vacuum device 130 can apply vacuum to an area of the vacuum belt 150 before or after the knife 124 makes contact with that area of the vacuum belt 150. Additionally, each area of the vacuum belt 150 can be rotated to pass by the debris removal device 100 many times to allow full and complete deburring of the debris 152 from the perforations 154.

As shown in FIG. 3, the vacuum device 130 clears debris 152 from the knife edge 126 and perforations 154 to keep the debris 152 from accumulating at the knife-belt interface. Additionally, the vacuum device 130 generates a pressure differential to improve contact between the belt and the knife. The pressure differential created by the vacuum device 130 pulls the entire width of the vacuum belt 150 material against the knife edge 126, mitigating issues with edge curl. The knife 124 is maintained by the bias assembly and controller 144 to contact the vacuum belt 150 at a shallow enough angle and low enough bias force to prevent damage or tearing of the vacuum belt 150.

Figure 4:
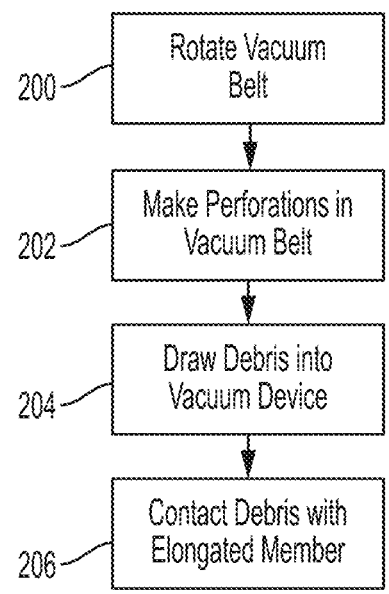
FIG. 4 is a flow diagram of various methods herein.

FIG. 4 is a flowchart showing aspects of various methods herein. As shown in FIG. 4, such methods include processing that, in item 200, rotates a vacuum belt on rollers that are connected to a frame. In item 202, these methods make perforations in the vacuum belt as the vacuum belt is rotated by the rollers using a perforation device connected to the frame. The process of making the perforations in item 202 can be performed using a punch device, a laser cutting device, etc. Sometimes the process of making of the perforations in the vacuum belt in item 202 causes debris to remain in at least one of the perforations.

In view of this, in item 204 these methods draw the debris from the perforations into a vacuum device connected to the frame by applying negative pressure from the vacuum device to the perforations. Additionally, in item 206 these methods contact the debris in the perforations using an elongated flat element connected to the frame (potentially simultaneously with operation of the vacuum device). More specifically, the processing in item 206 rotates the elongated flat element to the second position until it contacts the debris in the perforations. Again, the process of rotating the elongated flat element rotates the elongated flat element between a first position and a second position. The elongated flat element does not contact the debris in the perforations in the first position, but the elongated flat element does contact the debris in the perforations in the second position.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a frame; and
   an elongated flat element connected to the frame,
   wherein a perforation device, separate from the elongated flat element, is positioned and adapted to make perforations in a continuous belt material that is supported and rotated around the perforation device by rollers that are connected to the frame,
   wherein a vacuum device is positioned and adapted to draw debris from the perforations by applying negative pressure from the vacuum device to the perforations,
   wherein the elongated flat element is positioned to contact remaining ones of debris in the perforations,
   wherein the vacuum device is positioned, relative to the elongated flat element and the continuous belt material, to apply the negative pressure from the vacuum device to pull the continuous belt material against the elongated flat element,
   wherein the elongated flat element comprises a knife edge,
   wherein the elongated flat element is rotatable between a first position and a second position,
   wherein the knife edge is positioned for the vacuum device to not pull the continuous belt material against the knife edge and for the knife edge to not contact the debris in the perforations when rotated to the first position, and
   wherein the knife edge is positioned for the vacuum device to pull the continuous belt material against the knife edge and for the knife edge to contact the debris in the perforations when rotated to the second position.

2. The apparatus according to claim 1, wherein the elongated flat element is rotatably connected to the frame.

3. The apparatus according to claim 1, wherein the elongated flat element comprises the knife edge, and wherein the knife edge contacts the debris in the perforations.

4. The apparatus according to claim 1, wherein the elongated flat element comprises metal, plastic, or ceramic.

5. The apparatus according to claim 1, wherein the perforation device comprises a punch device or a laser cutting device.

6. The apparatus according to claim 1, wherein the continuous belt material comprises a plastic substrate.

7. An apparatus comprising:
   a frame;
   a perforation device, wherein the perforation device is positioned and adapted to make perforations in a continuous belt material that is supported and rotated around the perforation device by rollers that are connected to the frame, a vacuum device positioned and adapted to draw debris from the perforations by applying negative pressure from the vacuum device to the perforations; and an elongated flat element connected to the frame separately from the perforation device, wherein the elongated flat element is positioned to contact remaining ones of the debris in the perforations, wherein the vacuum device is positioned, relative to the elongated flat element and the continuous belt material, to apply the negative pressure from the vacuum device to pull the continuous belt material against the elongated flat element, wherein the elongated flat element comprises a knife edge, wherein the elongated flat element is rotatable between a first position and a second position, wherein the knife edge is positioned for the vacuum device to not pull the continuous belt material against the knife edge and for the knife edge to not contact the debris in the perforations when rotated to the first position, and wherein the knife edge is positioned for the vacuum device to pull the continuous belt material against the knife edge and for the knife edge to contact the debris in the perforations when rotated to the second position.

8. The apparatus according to claim 7, wherein the elongated flat element is rotatably connected to the frame.

9. The apparatus according to claim 8, wherein the elongated flat element comprises the knife edge, and wherein the knife edge contacts the debris in the perforations.

10. The apparatus according to claim 7, wherein the elongated flat element comprises metal, plastic, or ceramic.

11. The apparatus according to claim 7, wherein the perforation device comprises a punch device or a laser cutting device.

12. The apparatus according to claim 7, wherein the continuous belt material comprises a plastic substrate.

13. A method comprising:

making perforations in a continuous belt material with a perforation device;

wherein the continuous belt material is supported by and rotated around the perforation device using rollers attached to a frame;

drawing debris from the perforations into a vacuum device by applying negative pressure from the vacuum device to the perforations; and contacting remaining ones of the debris in the perforations using an elongated flat element connected to a frame separately from the perforation device, wherein the applying the negative pressure from the vacuum device pulls the continuous belt material against the elongated flat element, wherein the elongated flat element comprises a knife edge, wherein the elongated flat element is rotatable between a first position and a second position, wherein the knife edge is positioned for the vacuum device to not pull the continuous belt material against the knife edge and for the knife edge to not contact the debris in the perforations when rotated to the first position, and wherein the knife edge is positioned for the vacuum device to pull the continuous belt material against the knife edge and for the knife edge to contact the debris in the perforations when rotated to the second position.

14. The method according to claim 13, further comprising rotating the elongated flat element.

15. The method according to claim 13, wherein the elongated flat element comprises the knife edge, and wherein the contacting of the debris is performed using the knife edge.

16. The method according to claim 13, wherein the elongated flat element comprises metal, plastic, or ceramic.

17. The method according to claim 13, wherein the perforation device comprises a punch device or a laser cutting device, and wherein the making of the perforations comprises using the punch device or the laser cutting device.

* * * * *